(12) United States Patent
Diel

(10) Patent No.: US 10,758,852 B2
(45) Date of Patent: Sep. 1, 2020

(54) DEVICE FOR VENTILATION AND INTEGRITY SETTING

(71) Applicant: Sartorius Stedim Biotech GmbH, Goettingen (DE)

(72) Inventor: Bernhard Diel, Dransfeld (DE)

(73) Assignee: Sartorius Stedim Biotech GmbH, Göttingen (DE)

( * ) Notice: Subject to any disclaimer, the term of this patent is extended or adjusted under 35 U.S.C. 154(b) by 415 days.

(21) Appl. No.: 15/500,582

(22) PCT Filed: Jul. 28, 2015

(86) PCT No.: PCT/EP2015/001551
§ 371 (c)(1),
(2) Date: Jan. 31, 2017

(87) PCT Pub. No.: WO2016/045762
PCT Pub. Date: Mar. 31, 2016

(65) Prior Publication Data
US 2017/0216746 A1 Aug. 3, 2017

(30) Foreign Application Priority Data
Sep. 22, 2014 (DE) .......................... 10 2014 113 638

(51) Int. Cl.
*B01D 36/00* (2006.01)
(52) U.S. Cl.
CPC .................................. *B01D 36/001* (2013.01)
(58) Field of Classification Search
None
See application file for complete search history.

(56) References Cited

U.S. PATENT DOCUMENTS

| 4,909,937 | A |   | 3/1990  | Hoffmann et al. |
|-----------|---|---|---------|-----------------|
| 5,358,552 | A | * | 10/1994 | Seibert ................ B01D 46/002 55/291 |
| 5,468,388 | A |   | 11/1995 | Goddard et al.  |

(Continued)

FOREIGN PATENT DOCUMENTS

| DE | 94 07 371     | 7/1994 |
| DE | 43 21 927     | 1/1995 |
| DE | 10 2010 008 524 | 8/2001 |

OTHER PUBLICATIONS

English Translation of Interational Preliminary Report for Application No. PCT/EP2015/001551 dated Mar. 28, 2017.
International Search Report dated Oct. 28, 2015.

*Primary Examiner* — Robert J Popovics
(74) *Attorney, Agent, or Firm* — Gerald E. Hespos; Michael J. Porco; Matthew T. Hespos

(57) ABSTRACT

A device (1) is provided for ventilation and integrity testing of a filter unit (2) that can be supplied with pressure. The filter unit (2) has a filter element (9) arranged in a housing (6) between an inlet (7) and an outlet (8). The housing (6) can be ventilated by an air filter (3) connected to the housing interior (12). A filter valve (4) is arranged upstream of the air filter (3) facing the housing interior (12) and connects the air filter (3) to the housing interior (12). The air filter (3) can be connected on its side facing away from the housing interior (12) to a test line (14) for supplying pressure. An inlet valve (5) is arranged upstream of the inlet (7) and connects an inlet line (10) to the housing interior (12).

10 Claims, 3 Drawing Sheets

(56) References Cited

U.S. PATENT DOCUMENTS

| | | | |
|---|---|---|---|
| 7,708,880 B2* | 5/2010 | Yajima | B01D 19/0068 |
| | | | 210/167.01 |
| 2017/0216746 A1* | 8/2017 | Diel | B01D 36/001 |

* cited by examiner

DEVICE FOR VENTILATION AND INTEGRITY SETTING

BACKGROUND

1. Field of the Invention

The invention relates to a device for ventilation and integrity testing of a filter unit that can be supplied with pressure and has a filter element arranged in a housing between an inlet and an outlet, wherein the housing can be ventilated by means of an air filter connected to the housing interior.

2. Description of the Related Art

A filter unit that can be supplied with pressure and has a filter element arranged in a housing between an inlet and an outlet is known from DE 43 21 927 A1. In this case, the housing can be ventilated upwards in a vertical direction by means of a hydrophobic air filter.

Although the known device has proved worthwhile in principle, it has the disadvantage that the necessary test pressure for an integrity test is supplied via the inlet line at the location of the liquid to be filtered. As a result there is a danger that the air compressed into the system for integrity testing (IT testing) of the liquid filter leads to undesirable contamination from the exterior. In order to exclude such contamination, in the filter units of the prior art a further sterile air filter is necessary, by means of which the air for the IT testing must be supplied.

Since the entire filter and line system is generally used in pre-assembled form as a closed pre-sterilized unit, this gives rise to various further disadvantages with regard to such a construction.

In the region of the inlet, for example, rigid, non-expandable pressure lines made of plastic are used instead of expandable hoses, so that precise IT testing is actually possible. Such a rigid plastic device would increase the volume of the space on the inlet side, which in turn constitutes a critical disadvantage, since as a rule high-grade liquids are to be filtered which require the least possible mixing with rinsing liquid.

The object of the present invention is to improve the known device so that unwanted contamination can be prevented cost-effectively and securely, with low expenditure on process and materials and with a small volume.

SUMMARY

The invention relates to a device for ventilation and integrity testing of a filter unit that can be supplied with pressure. The filter unit has a filter element arranged in a housing between an inlet and an outlet. The housing can be ventilated by an air filter connected to the housing interior. A filter valve is arranged upstream of the air filter facing the housing interior and connects the air filter to the housing interior. The air filter can be connected on its side facing away from the housing interior to a test line for supplying pressure. An inlet valve, by means of which the housing interior is connected to an inlet line, is arranged upstream of the inlet.

Because a filter valve is arranged upstream of the air filter facing the housing interior, a test line for supplying the filter element or the liquid filter can be connected to the side of the air filter facing away from the housing interior. Moreover, it is possible to close the filter valve during the fluid filtration process and to prevent the air filter from coming into contact with pressurized fluid to be filtered and being wetted thereby. In this way, in the integrity testing (IT testing) of the liquid filter it is ensured that the air compressed into the system is filtered in a sterile manner by means of the integrated air filter element, and thus contamination from the exterior is avoided.

The air filter may be a hydrophobic filter. As a result, the air can escape from of the housing interior, i.e. the head space of the housing, into the atmosphere via the hydrophobic filter until the liquid level has reached the air filter. The liquid flow would then be stopped abruptly because of the hydrophobicity of the air filter when the liquid reaches the surface of the air filter.

Thus liquid is prevented from escaping from the device into the atmosphere, since the air filter is not permeable to the liquid or is only permeable to the liquid at very high pressure. If the filter unit is oriented vertically, the air that always collects at the highest point would automatically enter the air filter. The air filter is configured as a gas-permeable sterile filter.

This function can be used during the filling of the filter housing, but simultaneously can also be used in the course of the filtration process, i.e., as a permanent automatic ventilation function. This automatic "in-process ventilation" is practical in particular when, for example, air can collect in the filter housing due to air bubbles in the feed line system.

The filter valve may be connected by the inlet to the housing interior. As a result, only one single access to the housing interior is required for feeding liquid to be filtered, for feeding the test medium and for discharging gas or air, that is to say for ventilation.

The inlet valve may have a connector piece facing the housing. In this case, the connector is connected by a branch to the filter valve and to the air filter. The inlet valve, the filter valve and the air filter form a ventilation unit which can be connected by its connector piece to an inlet connection of the housing.

In this case, the connector piece and the branch can be configured as a T-piece, in which the branch branches off at a right angle from the connector piece.

The ventilation unit comprises the inlet valve, the filter valve and the air filter and can be connected by its connector piece to the inlet connection of the housing. The ventilation unit has the advantage that it does not have to be connected fixedly to the filter unit, but can be coupled separately thereto. Moreover, with the ventilation unit thus formed, filter units or filter capsules, which are already known and are of variable construction with regard to the housing and the housing interior, can be retrofitted to the device according to the invention. The construction of the filter unit can be simplified by the combination with the separate ventilation unit so that the filter unit itself does not require an air filter with associated connection and an inlet line for fluid that is separate from the air filter, but merely requires one single inlet connection for the connection to the ventilation unit.

The inlet connection of the ventilation unit and the inlet connection of the filter unit can be connected to one another by a so-called "tri-clamp" connection, by a flange piece, such as is known, for example, from DIN 32676, or other connectors. This enables a simple and secure connection of the ventilation unit to the filter unit and a further simplification of the structure of the filter unit that can be connected to the ventilation unit by a standardized flange piece.

The ventilation unit can be designed as a component in one piece and may comprise the inlet line for the inlet of the housing of the filter unit, the inlet valve, the connector piece, the T-piece, the filter valve, the branch line, the air filter, the connection for the air filter and the inlet connection for the ventilation unit as components fixedly installed in the ventilation unit.

The inlet valve and/or the filter valve can be controlled by manual or automatic valve switching. Automatic valve switching offers the advantage that the inlet valve and/or the filter valve can be connected to electrical or pneumatic drives, thus enabling fully or partially automatic valve switching coupled to a software system.

The one-piece component that forms the ventilation unit may be integrated firmly into the filter unit.

In an alternative embodiment of the invention, the inlet line for the inlet of the housing of the filter unit and the inlet valve form a separate component that can be connected by the T-piece, designed as a separate component, to a further separate component that comprises the branch line, the filter valve and the air filter. Thus, all components can be assembled by "tri-clamp" connections to form a ventilation unit.

The filter unit may be configured as a disposable filter capsule. Accordingly, the ventilation unit may be configured to be disposable. As a result, the device can be disposed of safely and simply after use.

The disposable device can be supplied and stored in a sterilized condition in a sterile packaging. As a result, handling thereof is not only simple, but also safe with respect to contaminants.

Further details, features and advantages of the invention are apparent from the following specific description and the drawings.

DETAILED DESCRIPTION

Figure 1:
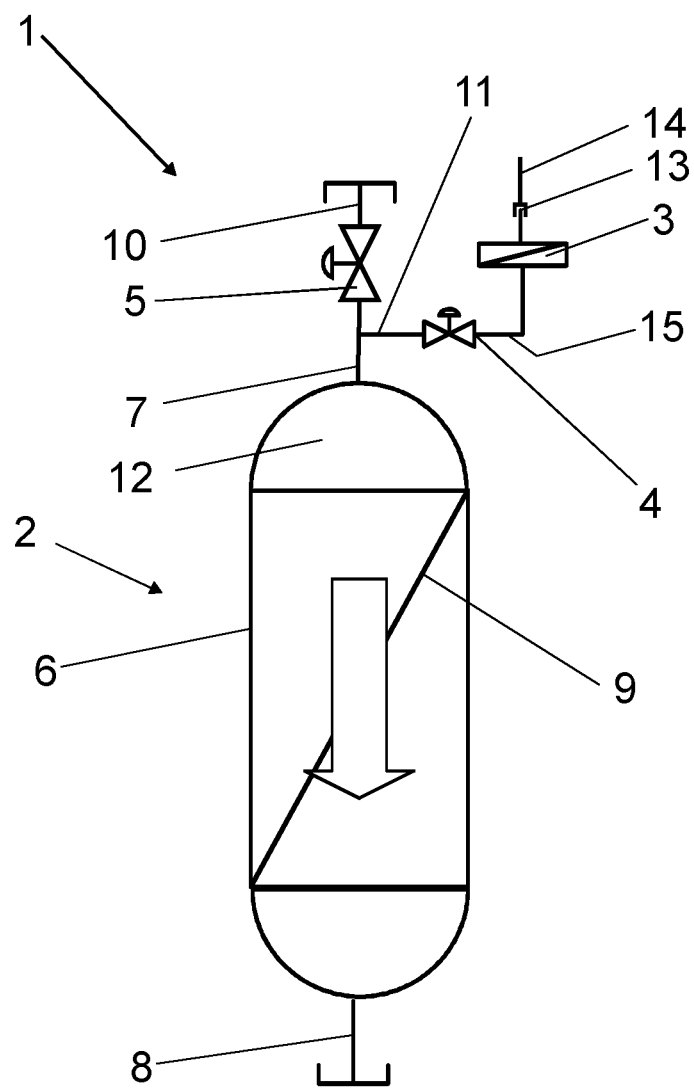
FIG. 1 shows a schematic representation of a device for ventilation and integrity testing.

A device 1 for ventilation and integrity testing consists substantially of a filter unit 2, an air filter 3, a filter valve 4 and an inlet valve 5.

The filter unit 2, which can be supplied with pressure, consists of a housing 6 and a filter element 9 that is arranged between an inlet 7 and an outlet 8 and that is configured as a filter for filtering liquids.

According to the exemplary embodiment of FIG. 1, the inlet 7 has an inlet line 10 in which the inlet valve 5 is upstream of the inlet 7 and thus upstream of the housing 6. In the inlet line 10, between the housing 6 and the inlet valve 5, a branch 11 is arranged, which, by means of the filter valve 4, connects the air filter 3, which is configured as a hydrophobic filter, to the housing interior 12 of the housing 6. On the side facing away from the filter valve 4, the air filter 3 has a test line 14 with a connection 13, by means of which the hydrophobic air filter 3 is connected to the test line 14 and to an integrity testing device (not shown). The air filter 3 is connected to the housing interior 12 by means of a branch line 15, by means of the filter valve 4 arranged in the branch line 15 and by means of the inlet line 10.

Figure 2:
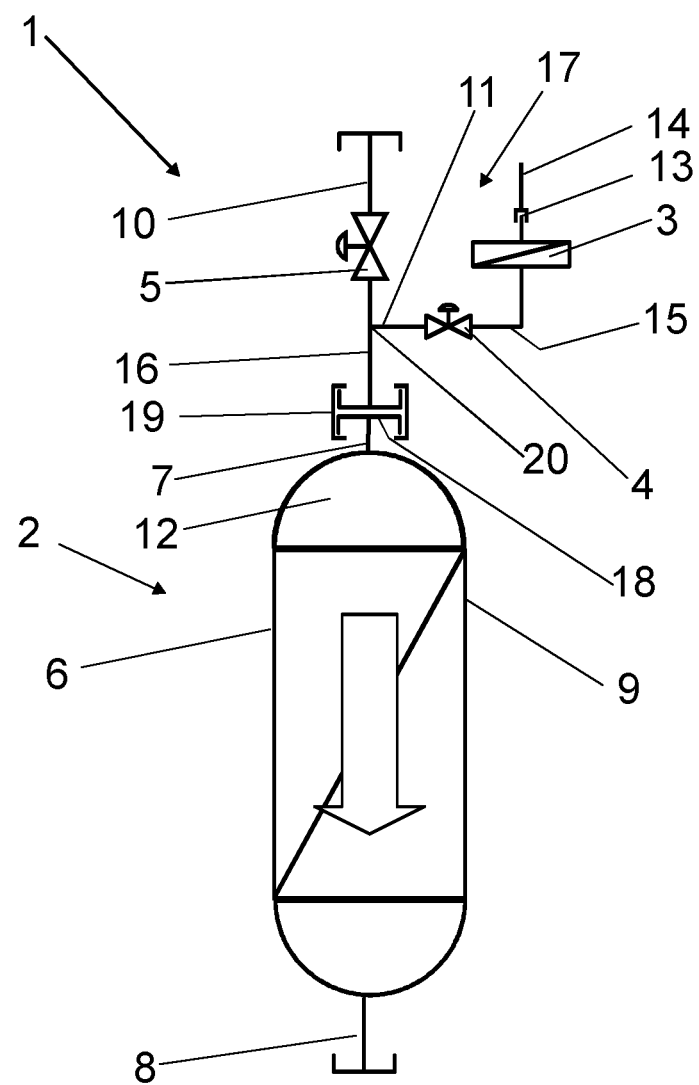
FIG. 2 shows a schematic representation of a device for ventilation and integrity testing, in which the inlet valve, the filter valve and the air filter form a ventilation unit which is connected by its connector piece to an inlet connection of the housing.

According to the exemplary embodiment of FIG. 2, the inlet valve 5 has, facing the housing 6, a connector piece 16 that is connected by means of the branch 11 to the filter valve 4 and to the air filter 3. In this case, the inlet valve 5, the filter valve 4 and the air filter 3 form a ventilation unit 17. The ventilation unit 17 can be connected by means of its connector piece 16 and by means of the inlet connection 21 to an inlet connection 18 of the housing 6 by means of a so-called tri-clamp connection (see DIN 32676) 19, a flange piece, a sterile connector with a male and female part or another quick-acting closure. According to FIG. 2, the connector piece 16 and the branch 11 are configured as a T-piece 20 in which the branch 11 branches off at a right angle from the connector piece 16. In other embodiments, the branch 11 branches off at different angles from the connector piece 16, for example, at a 45° angle.

Figure 3:
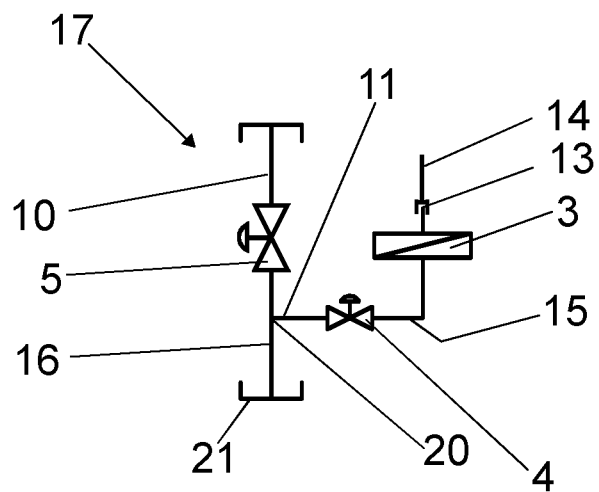
FIG. 3 shows a schematic representation of the ventilation unit of FIG. 2.
Figure 4:
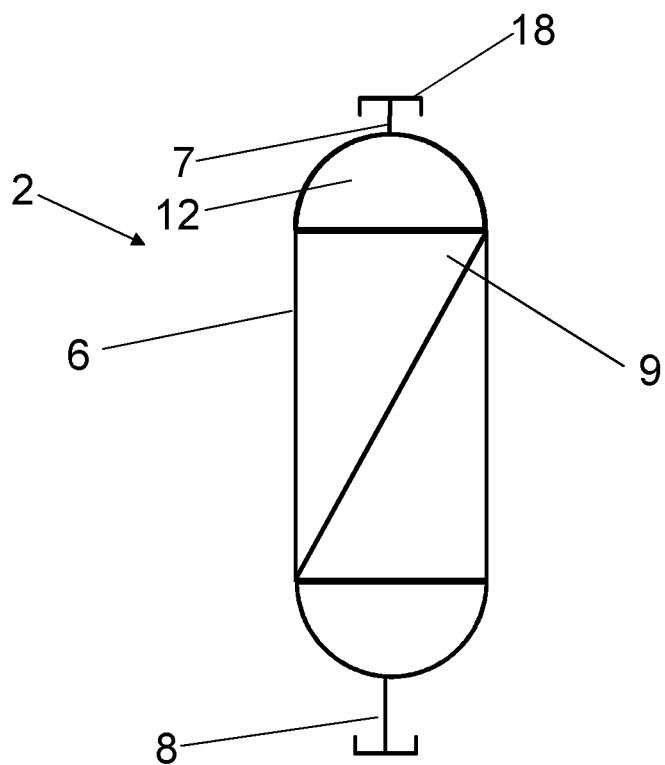
FIG. 4 shows a schematic representation of the filter unit of FIG. 2.

According to the exemplary embodiment of FIG. 3, the ventilation unit (17) can be designed as a component in one piece, which comprises the inlet line (10) for the inlet (7) of the housing (6) of the filter unit (2), the inlet valve (5), the connector piece (16), the T-piece (20), the filter valve (4), the branch line (15), the air filter (3), the connection for the air filter (13) and the inlet connection (21) for the ventilation unit (17) as components fixedly installed in the ventilation unit.

According to a further embodiment of the invention, the inlet valve (5) and/or the filter valve (4) can be controlled by a manual or automatic valve switching (not shown).

The aforementioned automatic valve switching offers the advantage that the inlet valve (5) and/or the filter valve (4) can be connected to electric or pneumatic drives (not shown), thus enabling fully or partially automatic valve switching coupled to a software system.

In a further development of the invention, the one-piece component which forms the ventilation unit (17) is firmly integrated into the filter unit (2).

In an alternative embodiment of FIG. 3, the inlet line (10) for the inlet (7) of the housing (6) of the filter unit (2) and the inlet valve (5) form a separate component, which can be connected by means of the T-piece (20), designed as a separate component, to a further separate component which comprises the branch line (15), the filter valve (4) and the air filter (3), wherein all components can be assembled by means of "tri-clamp" connections to form a ventilation unit (17).

The filter unit 2 and the ventilation unit 17 are configured and provided to be disposable.

The device 1 can be supplied and stored in a sterilized condition in a sterile packaging.

Naturally, the embodiments discussed in the specific description and shown in the drawings only constitute illustrative exemplary embodiments of the present invention. In the light of the present disclosure the person skilled in the art is offered a wide range of possible variations.

LIST OF REFERENCE SIGNS 1 device for ventilation and integrity testing
2 filter unit
3 air filter
4 filter valve
5 inlet valve
6 housing of 2
7 inlet of 6
8 outlet of 6

9 filter element of 2
10 inlet line of 7
11 branch of 10
12 housing interior of 6
13 connection of 3
14 test line
15 branch line
16 connecting piece
17 ventilation unit
18 inlet connection of 2
19 tri-clamp connection
20 T-piece
21 inlet connection of 17

The invention claimed is:

1. A device (1) for ventilation and integrity testing of a liquid-filtering filter element (9), the device (1) comprising:
a housing (6) having a housing interior (12) and the liquid-filtering filter element (9) being arranged in the interior (12) of the housing (6), the housing (6) having opposite top and bottom ends, an outlet (8) at the bottom end of the housing (6), and the housing (6) having only one single inlet (7) that is disposed at the top end of the housing (6)
an inlet valve (5) arranged upstream of the inlet (7) of the housing (6) and communicating with the inlet (7) for selectively connecting the housing interior (12) to an inlet line (10) that feeds liquid to be filtered to the inlet (7) and to the housing (6),
a branch (11) connected to the inlet (7) between the top end of the housing (6) and the inlet valve (5),
a hydrophobic air filter (3) in the branch (11) and a filter valve (4) arranged in the branch (11) at a position between the inlet (7) and the air filter (3), the filter valve (4) being opened selectively so that the housing interior (12) of the housing (6) can be ventilated via the inlet (7), the branch (11), the filter valve (4) and the hydrophobic air filter (3), a side of the hydrophobic air filter (3) facing away from the inlet (7) to the housing (6) having a connection (13) that is selectively connectable to a test line (14) for supplying pressure to the housing interior (12) of the housing (6) while the filter valve (4) is open to carry out integrity testing of the filter element (9), and the filter valve (5) being closed when fluid is delivered from the inlet line (10) through the inlet valve (5) and to the housing interior (12) and being open for venting the housing interior (12) or during integrity testing.

2. The device of claim 1, wherein
the inlet valve (5) has a connector piece (16) facing the housing (6), the connector piece (16) is connected by means of a branch (11) to the filter valve (4) and the air filter (3), the inlet valve (5), the filter valve (4) and the air filter (3) form a ventilation unit (17) that can be connected by the connector piece (16) to an inlet connection (18) of the housing (6).

3. The device of claim 2, wherein
the connector piece (16) and the branch (11) form a T-shaped piece (20), and wherein the branch (11) branches off at a right angle from the connector piece (16).

4. The device of claim 2, wherein
the ventilation unit (17) has an inlet connection (21) and the filter unit (2) has an inlet connection (18) that can be connected to the inlet connection (21) of the ventilation unit (17) by means of a tri-clamp connection (19), a flange piece, or a connector.

5. The device of claim 2, wherein
the ventilation unit (17) is a one-piece component that comprises the inlet line (10) for the inlet (7) of the housing (6) of the filter unit (2), the inlet valve (5), the connector piece (16), the T-shaped piece (20), the filter valve (4), the branch line (15), the air filter (3), the connection for the air filter (13) and the inlet connection (21) for the ventilation unit (17) as components fixedly installed in the ventilation unit.

6. The device of claim 2, wherein
the inlet line (10) for the inlet (7) of the housing (6) of the filter unit (2) and the inlet valve (5) form a separate component that can be connected by means of a T-shaped piece (20) a separate component, to a further separate component that comprises the branch line (15), the filter valve (4) and the air filter (3), wherein all components can be assembled by tri-clamp connections to form the ventilation unit (17).

7. The device of claim 2,
wherein
the ventilation unit (17) is disposable.

8. The device of claim 1,
wherein
the filter unit (2) is a disposable filter capsule.

9. The device of claim 1,
wherein
the air filter (3) is a gas-permeable sterile filter.

10. The device of claim 1,
wherein
the device (1) is a disposable device that can be supplied and stored in a sterilized condition in a sterile packaging.

* * * * *